United States Patent Office 3,535,183
Patented Oct. 20, 1970

3,535,183
**METHOD OF COATING FLEXIBLE SHEET MATE-
RIAL WITH A POLYMERIC COMPOSITION**
Anthony G. Marriott and Reginald D. Singer, Birmingham, England, assignors to The Dunlop Company Limited, London, England, a British company
No Drawing. Filed Feb. 5, 1968, Ser. No. 702,812
Claims priority, application Great Britain, Feb. 15, 1967,
7,153/67
Int. Cl. B29b 3/04; B44c 1/18, 1/20
U.S. Cl. 156—232                    20 Claims

ABSTRACT OF THE DISCLOSURE

A method of coating a flexible sheet material in which a composition is applied to a solid surface, the composition consisting of water, a polymer whose cross-linking is catalysed by hydrogen ions and a vaporizable base, the composition is dried and then the dried composition is heated in contact with a surface of the flexible sheet material to vaporize the base and cross-link the polymer. The composition may be initially applied direct to the surface of the flexible sheet material or it may be applied to a release surface and subsequently transferred to the surface of the flexible sheet material by a film transfer technique of which the following is a specification.

---

This invention relates to a method of applying a coating composition to a surface of a flexible sheet material.

According to the present invention, a method of producing a coating on a flexible sheet material comprises applying to a solid surface a composition comprising water, a cross-linkable polymer whose cross-linking is catalysed by hydrogen ions, and a vaporizable base as hereinafter defined, the pH of the composition during its application to the solid surface being greater than 7, drying the composition and heating the dried composition in contact with a surface of the flexible sheet material to vaporize the vaporizable base and cross-link the polymer.

According to the present invention also, there is provided a flexible sheet material having a surface coating produced by the method described in the immediately-preceding paragraph.

The vaporizable base employed is a basic compound which is vaporizable at or below the temperature of cross-linking of the polymer but above the temperature employed to dry the composition and preferably above room temperature.

The vaporizable base maintains the composition at a pH of at least 7 and thereby prevents cross-linking of the polymer until the base is removed. Examples of suitable vaporizable bases are ammonia, morpholine, trialkyl-amines such as trimethylamine or triethylamine, and dialkyl monohydroxyalkyl amines such as diethylamino-ethanol.

The temperature of cross-linking of the polymer depends upon the nature of the polymer so that the choice of vaporizable base depends largely on the polymer used.

The cross-linkable polymer is one containing functional groups which are cross-linkable in the presence of hydrogen ions as catalyst. The functional groups may be, for example, hydroxyl and/or carboxyl groups and a preferred polymer is one having methylol groups, especially one in which each methylol group is directly attached to the nitrogen atom of an amide group.

The polymer normally comprises units derived from one or more monomers having one or more functional groups and units derived from one or more further monomers which are copolymerizable therewith. The units derived from the monomer or monomers having functional groups are normally present in an amount of not more than 20 percent by weight of the polymer and preferably not more than 10 percent by weight of the polymer. The polymer preferably also comprises at least 50 percent by weight, especially at least 70 percent by weight of units derived from a "soft" monomer, i.e. a monomer whose homopolymers have a glass transition point below room temperature, i.e. below 15° C. in order to produce a flexible coating. The preferred "soft" monomers are alkyl esters of methacrylic acid in which each alkyl group has more than four carbon atoms and alkyl esters of acrylic acid but examples of other suitable "soft" monomers are butadiene and isoprene. Units derived from "hard" monomers, i.e. monomers whose homopolymers have a glass transition temperature above room temperature i.e. above 15° C., may also be present if desired although the amount of such units should not be sufficient to produce an inflexible coating. Examples of such "hard" monomers are styrene, alphamethyl styrene, methyl methacrylate and acrylonitrile.

Preferably, the polymer is one having a number of methylol groups each attached directly to the nitrogen atom of an amide group. Such groups may be produced by including in the polymer units derived from an unsaturated methylol amide such as methylol acrylamide or methylol methacrylamide, or an ether of an unsaturated methylol amide. Suitable methylol amides may be prepared by condensing an aldehyde with an amide and suitable ethers may be prepared by reacting an unsaturated methylol amide with a primary aliphatic alcohol.

Alternative to or in addition to methylol groups, the polymer may comprise other hydroxyl groups and/or other functional groups such as carboxyl groups. Examples of polymer units containing other hydroxyl groups are those derived from hydroxy ethyl acrylate, hydroxy ethyl methacrylate or hydroxy propyl methacrylate. Examples of polymer units containing carboxyl groups are those derived from acrylic acid, methacrylic acid, itaconic acid or cinnamic acid.

The polymer employed in the method of this invention is cross-linkable in the presence of hydrogen ions. The polymer may be inherently cross-linkable or it may require the use of a cross-linking agent. In general, polymers having hydroxyl and/or carboxyl groups require the use of a cross-linking agent in order to become cross-linked. A suitable cross-linking agent for such polymers is a potentially-thermosetting aminoplast, e.g. a melamine/aldehyde resin, a urea/formaldehyde resin or a benzo-guanamine/aldehyde resin. However, the polymers having methylol groups are inherently cross-linkable and thus the use of a cross-linking agent is not necessary although one may be employed if desired.

The composition comprises water and the polymer may be present as a solution, dispersion or emulsion in the water. If desired, the composition may include a pigment and/or a plasticizer.

The method of this invention is particularly advantageous when it is desired to produce an embossed coating on a flexible sheet material. The emboss is produced on the dried composition before the polymer has been substantially cross-linked.

The solid surface to which the composition is initially applied is either a surface of the flexible sheet material or a release surface.

When the solid surface is a surface of the flexible sheet material the composition is applied to the surface of the sheet material and dried and cross-linked thereon. In this case the coating may be embossed after drying and before substantial cross-linking. Embossing may take place at an elevated temperature which vaporizes at least part of the vaporizable base and at least partially cross-links the polymer. The composition may, if desired, be further heated to further cross-link the polymer after embossing.

When the solid surface is a release surface the composition may be dried on the release surface. The film of dried composition so formed is subsequently applied to a surface of the flexible sheet material and stripped from the release surface by a suitable film transfer technique. The release surface may be an embossed surface so that an embossed surface is obtained on the finished coated flexible sheet material. The material of the release surface can be, for example, any plastic material, paper, glass or polished metal from which the polymer film may be readily stripped. Examples of suitable plastic materials are polyethylene, polypropylene, poly(ethylene terephthalate) and poly(tetrafluoroethylene). Preferably the release surface is the surface of a release paper.

The composition may be applied to the solid surface by any suitable method such as by spraying, brushing or dipping.

The cross-linking of the polymer can be accelerated, if desired, by the use of an acid catalyst such as oxalic acid, para-toluene sulphonic acid, phosphoric acid, phthalic acid or hydrochloric acid, and/or by heating. The amount of catalyst which may be present can suitably be from 0.1 to 5 percent by weight of the polymer. When an acidic catalyst is employed the vaporizable base employed should be more volatile than the catalyst. The catalyst may be present in the composition as initially applied to the solid surface or it may be added after the composition has been applied. In the latter case the non-vaporizable base present should be in an amount sufficient to retain the composition in an alkaline condition when the catalyst is added.

The coatings produced by the method of this invention are heat-deformable and are very resistant to flex-cracking.

The flexible sheet materials which may be provided with a coating by the method of this invention may suitably be leather-like flexible sheet materials such as natural leather and synthetic flexible sheet materials having the appearance of natural leather and capable of being used to replace natural leather in most of its application such as in shoe uppers, shoe linings, upholstery, clothing and handbags.

One suitable synthetic flexible sheet material is a leather-like sheet material comprising a consolidated mat of interpenetrated crimped continuous filaments bonded together with an elastomeric or resinous bonding agent, the interpenetration of the filaments being in the nature of an intermingling at random in three dimensions produced by laying the crimped continuous filaments under tension and subsequently releasing the tension. If desired, the mat may be modified by attaching it to, for example, a layer of staple fibres and/or a woven fabric.

An alternative suitable synthetic flexible sheet material is one comprising a compressed sheet of a cellular plastic material maintained in a compressed condition by means of an adhesive.

A further suitable synthetic flexible sheet material is one comprising a compressed sheet of a cellular plastic material adhered to one surface of a fibrous material or a further cellular plastic material. The compressed sheet of a cellular plastic material may be adhered to a surface of a fibrous material or a further cellular plastic material in the absence of an adhesive between the layers, if desired.

Alternatively the compressed sheet of a cellular plastic material may be adhered to a surface of a fibrous material or a further cellular plastic material by a flame bonding technique using an intermediate layer of cellular plastic material.

A further suitable synthetic flexible sheet material comprises two superimposed compressed sheets of a cellular plastic material at least one of which sheets comprises a fibrous material distributed within it.

The flexible sheet material may comprise a compressed sheet of cellular plastic material having a density of from 0.85 to 1.05 gm./cc.

Any of the above synthetic flexible sheet materials comprising a compressed sheet of a cellular plastic material may be impregnated with a binder composition.

The invention is illustrated in the following examples.

EXAMPLE I

A synthetic fibre felt was made as follows:

A web sheet of continuous nylon filaments of denier 840 was passed over a heated plate and then over a cooled knife-edge at an approximate included angle of 28° to crimp the filaments. A number of the crimped sheets, still held under tension, were laid one upon the other, and the assembled sheets were allowed to relax (i.e. released from tension) so that the filaments were allowed to crimp. During relaxation the filaments were heated at about 100° C.

A staple fibre non-woven fabric was prepared consisting of polypropylene staple fibres of 3 denier. The nylon web was laid on the staple fibre web and the assembly was passed four times through a needle punching machine adjusted to give 800 needle punches per square inch, so that the assembly received a total of 3200 needle punches per square inch. The depth of penetration of the barbed needles was 1/16 inch.

The needled non-woven assembly weighed 27 grams/sq. ft. and was compressed at 145° C. to 1 mm. by being passed through two nips of a 3-bowl calender. The non-woven assembly was sprayed with 15 grams/sq. ft. of water prior to compression.

A 0.31 inch thick sheet of a reticulated polyester polyurethane foam having a density of 1.5 lb./cu. ft. and an average pore count of 60 pores per linear inch was compressed to a thickness of 0.016 inch at 180° C. for 5 minutes in a platten press.

1 sq. ft. of woven fabric having the following specifications:

Material: Continuous filament 60 denier nylon yarns (each yarn consisting of 20 continuous filaments).
Ends per inch 104.
Picks per inch 90.
Turns per inch 7½.
Weight 1.6 oz./sq. yd.

was saturated with an adhesive latex made to the following formulation and which had been matured for 24 hours at 20° C.

| | Parts by weight |
|---|---|
| Pliolite 2108 [1] (40 percent solids) | 500 |
| Resorcinol | 11 |
| Aqueous formaldehyde (37 w./v.) | 16.2 |
| Water | 186.8 |

[1] Proprietary brand SBR latex.

The fabric was saturated by pulling it through a bath containing the adhesive latex and the excess latex was removed by passing the saturated fabric between two scraper bars. The fabric picked up 2 grams dry weight of adhesive per sq. ft. The fabric was laid while still wet on to the compressed polyester polyurethane foam layer and the needled non-woven assembly was brought into contact with the other side of the fabric. The composite product was then dried for 2 minutes at 140° C. by being held in contact with a rotating drum at 5 p.s.i. by a Terylene (polyethylene terephthalate) mesh belt.

A latex was prepared as follows:

0.6 part by weight of a latex thickening agent available under the trade name Viscalex E.M. 15 as a 15 percent aqueous dispersion of polyacrylic acid was diluted with 40 parts by weight of water. Ammonia (aqueous) was added to the resulting latex until the latex had a pH of 11.0. This latex was mixed into 100 parts by weight of a natural rubber latex (dry solids content 60 percent) which was then allowed to cream for 2 days. After this time, a clear serum had formed at the bottom of the latex and this serum was stirred back into the latex. The following ingredients were then mixed into 100 parts by weight of the latex:

Ingredients: Parts by weight
1. Aqueous solution of potassium oleate _____ 5.0
2. Aqueous dispersion of di-beta-naphthyl-paraphenylenediamine _____ 1.0
3. Aqueous dispersion of zinc mercaptobenzthiazole _____ 2.0
4. Aqueous dispersion of zinc diethyl dithiocarbamate _____ 1.0
5. Aquous dispersion of sulphur _____ 2.5
6. Aqueous dispersion of zinc oxide _____ 2.5
7. 50 percent emulsion of silicone oil _____ 3.0
8. 10 percent solution of sodium isopropyl xanthate _____ 0.4
9. Aqueous solution of ammonium chloride ___ 3.0

Ingredient 1 was a solution of 15 grams of potassium oleate per 100 grams of the solution, Ingredient 2 contained 40 grams of the solid per 100 grams of the dispersion, Ingredients 3 to 6 contained 50 grams of the solid per 100 grams of the dispersion, and Ingredient 9 contained 20 grams of the solid per 100 grams of the solution.

A portion of the resulting latex was poured on to a flat tray and the foam-fabric-needled non-woven assembly was placed on the latex with the polyester polyurethane foam layer uppermost. The latex was seen to permeate through the foam to the top surface and when this had been achieved the saturated composite structure was removed from the tray. Excess latex was removed by scraping from the bottom surface of the assembly and the composite structure was placed in a steam oven to gel the latex impregnate. The latex was cured in steam at 100° C. for 20 minutes and then dried in hot air.

A pigmented finishing composition was prepared from the following ingredients:

Parts by weight
Primal HA 24 _____ 1.5
Water _____ 1.5

"Primal HA 24" is a commercially-available latex of a cross-linkable polymer. The latex had a pH of 3.5.

Morpholine was added dropwise with stirring to the mixture until the pH of the mixture reached 7.5 to 8, and then 1 part by weight of Primal black was added.

Three spray coats of the above composition were applied to the impregnated foam-fabric-needled non-woven assembly, i.e. the unfinished product, and each successive coat was dried at 40° C.

The coated surface of the assembly was placed in contact with a chromium-plated steel embossing plate at 130° C. for 3 minutes at a pressure of 39 lb./sq. in., after which the coated surface was seen to possess a true reproduction of the embossing surface of the plate. The embossed assembly was heated at 100° C. for 30 minutes in an air-oven to complete the cross-linking of the polymer.

A similar assembly was treated as described above except that no morpholine was added to the polymer mixture. It was found that the coating did not possess a reproduction of the embossing surface of the plate.

Both of the above coated assemblies showed no surface cracking or flaking after 1 million vamp flexes on a S.A.T.R.A. (Shoe and Allied Trades Research Association of Great Britain) vamp-flexing machine.

EXAMPLE II

An unfinished product as described in Example I was finished by the following technique.

A film was formed on release paper (Stripkote ARC IS supplied by the Warren Paper Company) by spraying onto the paper two coats of the following composition, drying out between each coating under I.R. heaters.

Primal HA 24—300 gm.
Water—300 gm.
Monoethanolamine added dropwise with stirring to bring pH to 7.5–8.0.
Primal black—100 gm.

The compressed foam surface of the unfinished product was then sprayed with four coats of the composition given above and each coat was dried out as before. The film from the release paper was transferred to the coated substrate by passing the paper, film side uppermost, over the top roll of a pair of heated nip rolls, at 170° C., and into the nip to meet the sprayed side of the product which was fed horizontally into the nip. Pressure was applied by setting the nip at 0.050 inch with a product thickness of 0.060 inch. The paper was separated from the substrate after cooling and the film had transferred from the paper to the substrate, to which it was well adhered. The finished product was then placed in an air oven at 100° C. for 2 hours to cure the finish.

The leather-like product vamp-flexed $10^6$ cycles without damage and had a Water Vapour Permeability, hereinafter designated W.V.P., of 1.2 mg./cm.$^2$/hr.

EXAMPLE III

An unfinished product as described in Example I was finished by the technique described in Example II, the finish applied having the following composition:

Copolymers of 95% ethyl acrylate 5% methylol acrylamide (40% aqueous emulsion)—100 gm.
Water—78 gm.
Monoethanolamine to bring pH to 7.5–8.0
Primal black—29.6 gm.

The finish was post cured by placing the finished leather-like product in an air oven at 100° C. for 2 hours. The resulting leather-like product vamp-flexed $10^6$ cycles without signs of damage and had a W.V.P. of 0.9 mg./cm.$^2$/hr.

EXAMPLE IV

An unfinished product as described in Example I was finished by the technique described in Example II. The finish applied had the following composition:

95% ethyl acrylate 5% methacrylic acid copolymer (40% aqueous emulsion)—100 gm.
Water—78 gm.
Monoethanolamine to bring pH to 7.5–8.0.
Primal black—29.6 gm.

After applying the finish it was post-cured by placing the finished leather-like product in an air oven at 100° C. for 2 hours.

The leather-like product obtained vamp-flexed $10^6$ cycles without damage and had a W.V.P. of 1.0 mg./cm.$^2$/hr.

EXAMPLE V

An unfinished product as described in Example I was finished by the technique described in Example II. The finish used had the following composition:

96% ethyl acrylate 2% methylol acrylamide 2% methacrylic acid copolymer (40% aqueous emulsion)—100 gm.
Water—78 gm.
Monoethanolamine to bring pH to 7.5–8.0.
Primal black—29.6 gm.

After application the finish was cured by placing the leather-like product in an air oven at 100° C. for 2 hours.

The resulting leather-like material vamp-flexed $10^6$ cycles without damage and had a W.V.P. of 1.0 mg./cm.$^2$/hr.

EXAMPLE VI

An unfinished product as described in Example I was finished by the technique described in Example II. The finish applied had the following composition:

95% ethyl acrylate 5% methylol acrylamide copolymer (40% aqueous emulsion)—100 gm.
Water—78 gm.
Oxalic acid—0.8 gm.
Monoethanolamine to bring pH to 7.5–8.0.
Primal black—29.6 gm.

After application the finish was cured by placing the leather-like product in an air oven at 100° C. for 2 hours. The leather-like product obtained vamp-flexed $10^6$ cycles without damage and had a W.V.P. of 1.1 mg./cm.$^2$/hr.

Having now described our invention, what we claim is:

1. A method of producing a coating on a flexible sheet material from a polymer composition which comprises applying to a solid surface a composition comprising water, a polymer whose cross-linking is catalysed by hydrogen ions, and a vaporizable base being a basic compound which is vaporizable at a temperature above the temperature employed to dry the composition and not greater than the temperature of cross-linking of the polymer, the pH of the composition during its application to the solid surface being greater than 7, drying the composition, and heating the dried composition in contact with a surface of the flexible sheet material to vaporize the vaporizable base and cross-link the polymer.

2. A method according to claim 1 in which the vaporizable base is morpholine.

3. A method according to claim 1 in which the vaporizable base is monoethanolamine.

4. A method according to claim 1 in which the solid surface to which the composition is applied is the surface of the flexible sheet material.

5. A method according to claim 4 in which the dried composition is embossed before the polymer has been substantially cross-linked.

6. A method according to claim 5 in which the embossing is carried out at an elevated temperature which vaporizes at least part of the vaporizable base and at least partially cross-links the polymer.

7. A method according to claim 1 in which the solid surface to which the composition is applied is a release surface from which the composition is transferred to the surface of the flexible sheet material after the composition has been dried.

8. A method according to claim 7 in which the release surface is an embossed surface.

9. A method according to claim 1 in which the polymer contains hydroxyl and/or carboxyl groups.

10. A method according to claim 9 in which the composition includes as a cross-linking agent, a potentially thermosetting aminoplast.

11. A method according to claim 9 in which the composition comprises an acid catalyst for the cross-linking of the polymer.

12. A method according to claim 9 in which the polymer contains methylol groups.

13. A method according to claim 12 in which the polymer contains methylol groups each methylol group being attached directly to the nitrogen atom of an amide group.

14. A method according to claim 1 in which the flexible sheet material is natural or synthetic leather.

15. A method according to claim 14 in which the flexible sheet material is synthetic leather comprising a sheet of compressed cellular material adhered to a sheet of a fibrous material or a further cellular material.

16. A method according to claim 9 in which the polymer comprises units derived from one or more monomers having the hydroxyl and/or carboxyl groups and units derived from one or more further monomers copolymerizable therewith, the units derived from the monomer having the hydroxyl and/or carboxyl groups being present in an amount not more than 20 percent by weight of the polymer.

17. A method according to claim 16 in which the monomer having hydroxyl and/or carboxyl groups is methacrylic acid.

18. A method according to claim 16 in which the polymer comprises at least 50 percent by weight of units derived from a "soft" monomer the "soft" monomer being a monomer whose homopolymers have a glass transition point below 15° C.

19. A method according to claim 16 in which the monomer having hydroxyl and/or carboxyl groups is an unsaturated methylol amide.

20. A method according to claim 19 in which the monomer having hydroxyl and/or carboxyl groups is methylol.

References Cited

UNITED STATES PATENTS

| | | | |
|---|---|---|---|
| 2,414,407 | 1/1947 | Freudenberg | 260—88.3 X |
| 3,241,994 | 3/1966 | Madaras et al. | 117—11 |
| 3,257,252 | 6/1966 | Keel | 117—11 X |
| 3,268,915 | 8/1966 | Warnock et al. | |
| 3,278,322 | 10/1966 | Harkins et al. | 117—11 X |
| 3,434,862 | 3/1969 | Luc | 117—10 |

FOREIGN PATENTS

| | | |
|---|---|---|
| 914,928 | 1/1963 | Great Britain. |
| 962,109 | 6/1964 | Great Britain. |
| 989,433 | 4/1965 | Great Britain. |

ALFRED L. LEAVITT, Primary Examiner

T. E. BOKAN, Assistant Examiner

U.S. Cl. X.R.

117—3.1, 10, 11, 104, 111, 113; 156—246; 260—29.4, 29.6, 29.7, 72, 80.3, 82.1, 85.5, 86.1, 86.7, 851, 852, 855, 856